United States Patent
Efimov

(10) Patent No.: US 8,263,928 B1
(45) Date of Patent: Sep. 11, 2012

(54) HIGH SPEED PHOTONIC ANALOG TO DIGITAL QUANTIZER

(75) Inventor: Oleg M Efimov, Thousand Oaks, CA (US)

(73) Assignee: HRL Laboratories, LLC, Malibu, CA (US)

(*) Notice: Subject to any disclaimer, the term of this patent is extended or adjusted under 35 U.S.C. 154(b) by 889 days.

(21) Appl. No.: 12/134,335

(22) Filed: Jun. 6, 2008

(51) Int. Cl.
*G02B 6/34* (2006.01)
(52) U.S. Cl. .................. 250/227.11; 250/227.18; 385/8
(58) Field of Classification Search ............. 250/227.11, 250/227.18; 385/8
See application file for complete search history.

(56) References Cited

U.S. PATENT DOCUMENTS

| | | | |
|---|---|---|---|
| 4,325,603 A | * | 4/1982 | Marom ........................... 385/40 |
| 6,640,020 B2 | | 10/2003 | Ionov |

OTHER PUBLICATIONS

G. C. Valley, "Photonic analog-to-digital converters" Optics Express, v15, No. 5 pp. 1955-1982, 2007.
H. Taylor, "An optical analog to digital converter—Design and Analysis", IEEE Journal of Quantum Electronics v 15 pp. 210-216, 1979.
J. Hukriede, D. Runde, D. Kip, "Fabrication and Application of Holographic Bragg Gratings in Lithium Niobate Channel Waveguides", Journal Physics D: Applied Physics v36 pp. R1-R16, 2003.
Herwig Kogelnik, "Coupled Wave Theory for Thick Hologram Grating" Bell System Technical Journal, vol. 48, Nov. 1969, No. 9, pp. 2909-2951.
G.E. Town, K. Sugden, J.A.R. Williams, I. Bennion, S.B. Pool. "Wide-band Fabry-Perot-like filters in optical fiber," IEEE Photonics Technology Letters, v.7, No. 1, pp. 78-80, 1995.
G.P. Agrawal, S. Radic. "Phase-shifted fiber Bragg gratings and their application for wavelength demultiplexing," IEEE Photonics Technology Letters, v.6, No. 8, pp. 995-997, 1994.
J. Canning, M.G. Sceats. "Pi-phase-shifted periodic distributed structures in optical fibres by UV postprocessing," Electronics Letters, v.30, No. 16, pp. 1344-1345, 1994.
C. L. Chang and C. S. Tsai, "Electro-Optic Analog to Digital Converter using Channel Waveguide Fabry-Perot Modulator Array", Applied Physics Letters 43(1) Jul. 1983.
Shelia Galt, Anders Magnusson, and Sverker Hard, "Dynamic demonstration of diffractive optic analog-to-digital converter scheme", Applied Optics vol. 42 No. 2, Jan. 10, 2003.
Yoshito Tsunoda and Joseph Goodman, "Combined optical AD conversion and page composition for holographic memory applications", Applied Optics vol. 16, No. 10 Oct. 1977.

* cited by examiner

*Primary Examiner* — Tony Ko
(74) *Attorney, Agent, or Firm* — George R. Rapacki; Daniel R. Allemeier

(57) ABSTRACT

An input analog signal is applied to electrodes bracketing electro-optically responsive waveguides being driven by a continuous wave or pulsed laser. The waveguides have reflection elements installed with transmission spectra sized, located and designed to transmit the laser light to photodetectors. The transmission of the laser light depends on the shift in transmission spectra caused by the applied analog voltage. The reflection element transmits laser light according to a digital encoding design. The second embodiment describes a device and method for converting high frequency analog signals greater than approximately 10 GHz into digital signals. The high frequency quantizer relies on reflectors reflecting the laser light as a high frequency RF pulse propagates along electrodes bracketing the electro-optically responsive material in the opposite direction of the laser light.

20 Claims, 13 Drawing Sheets

Example of high-speed digitizer schematic diagram of 3-bit binary code digitizer;

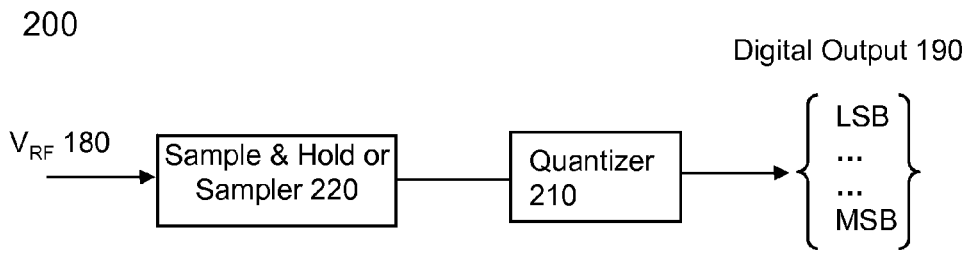
Figure 1a. Generic Analog to Digital Converter
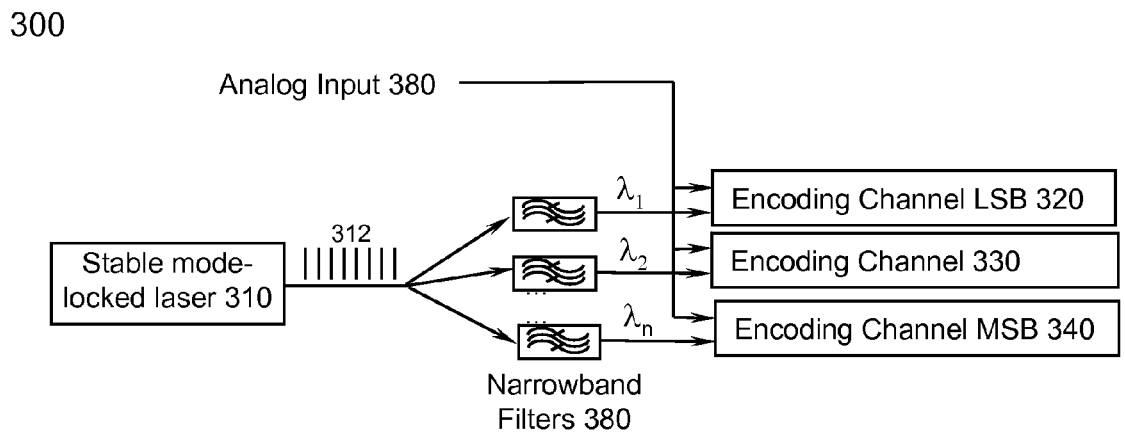
Figure 1b. Schematic of photonic quantizer with a stable mode locked laser, multiple narrowband filters each with a single pass band and encoding channels

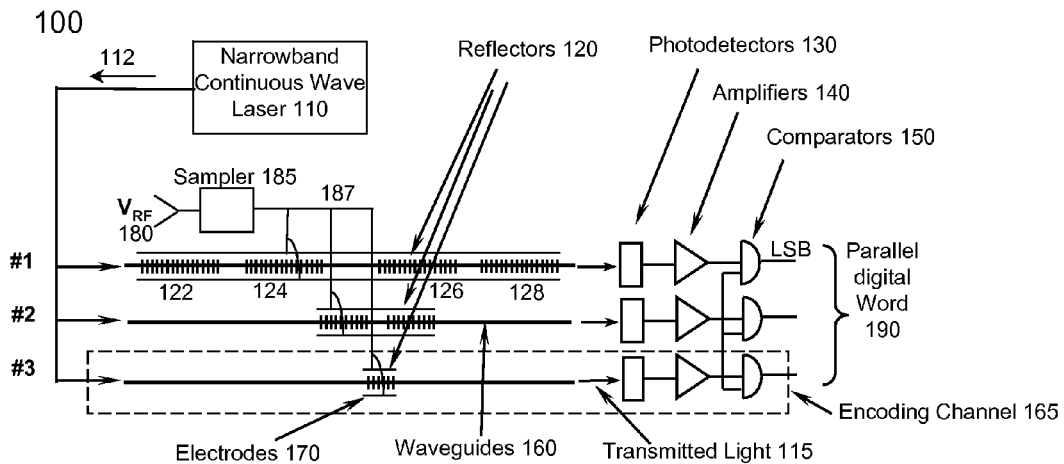
Figure 2a. Example of high-speed digitizer schematic diagram of 3-bit binary code digitizer;
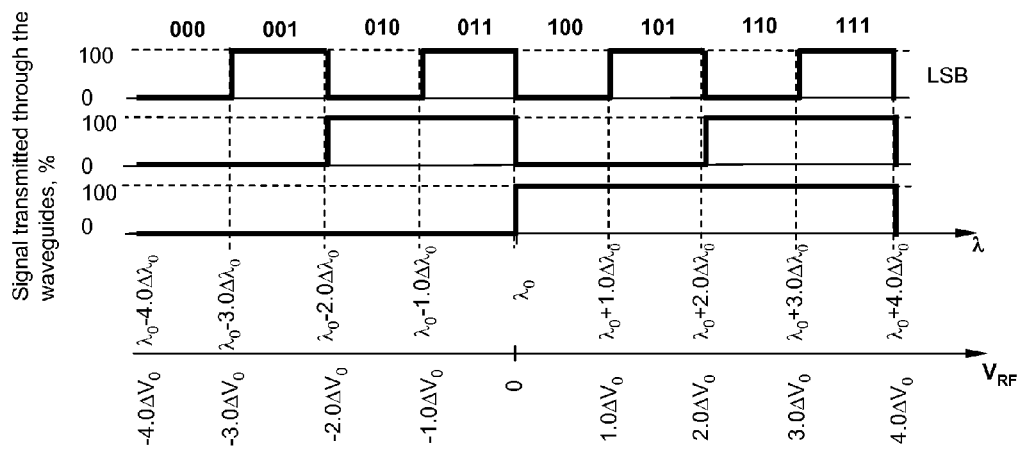
Figure 2b. Transmission spectra of gratings recorded in waveguides shown in Figure 1a, top to bottom: channels #1, #2, and #3 as a function of $V_{RF}$

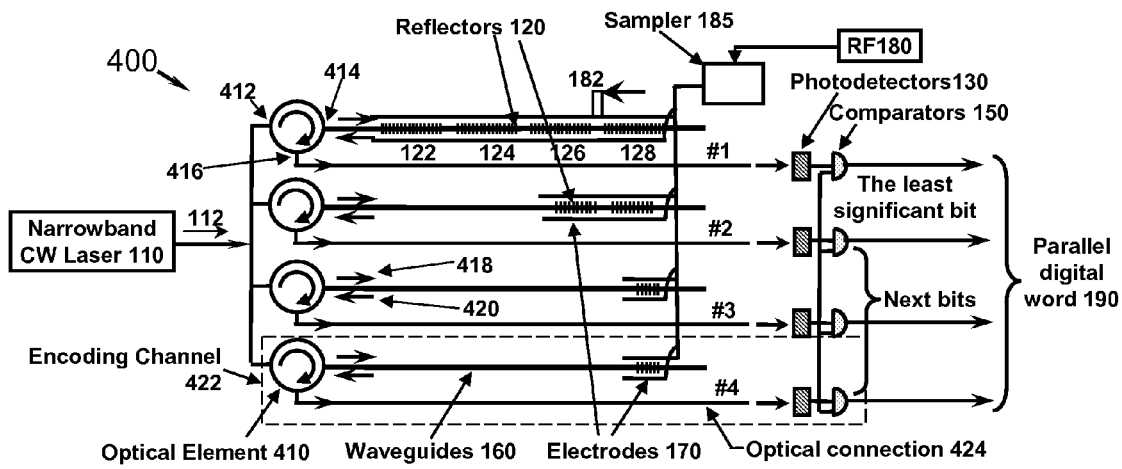
Figure 3a. Exemplary design of high-speed digitizer showing continuous wave light and pulsed reflected light.
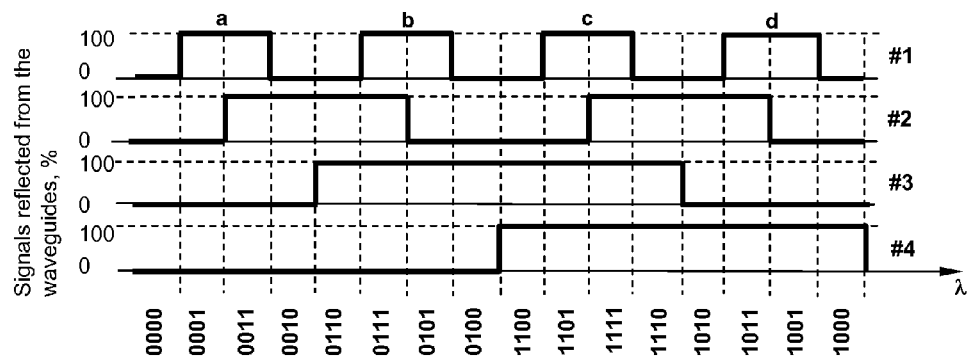
Figure 3b. Exemplary design of proposed high-speed 4-bit Gray code digitizer with reflection spectra of reflectors recorded over the waveguides.

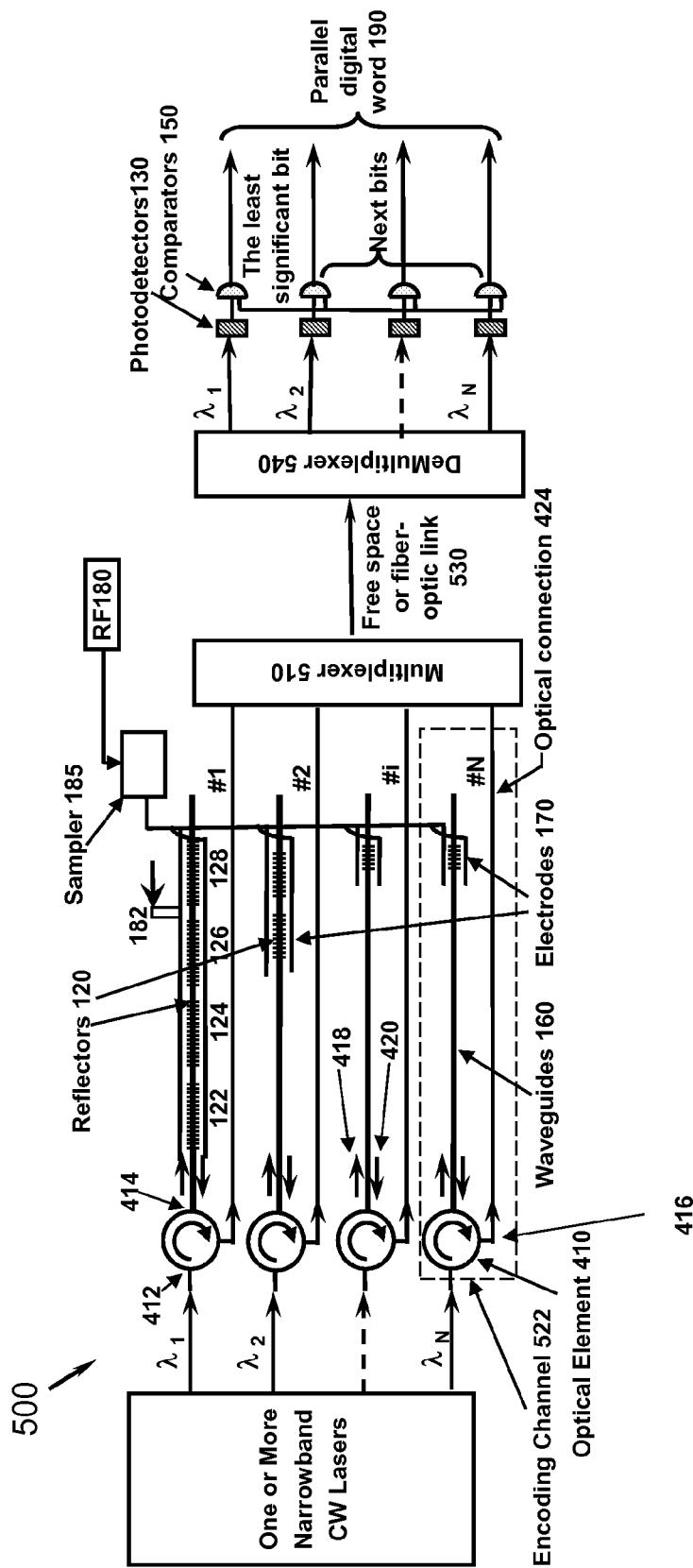
Figure 4 Exemplary design of analog to digital communication channel

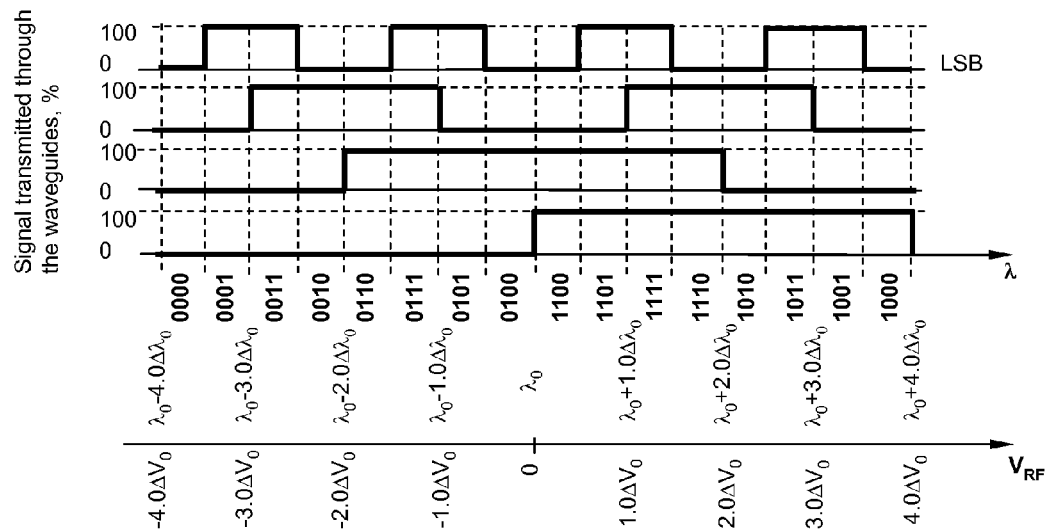
Figure 5. Transmission spectra of gratings recorded in 4 waveguides for 4-bit Gray code digitizer
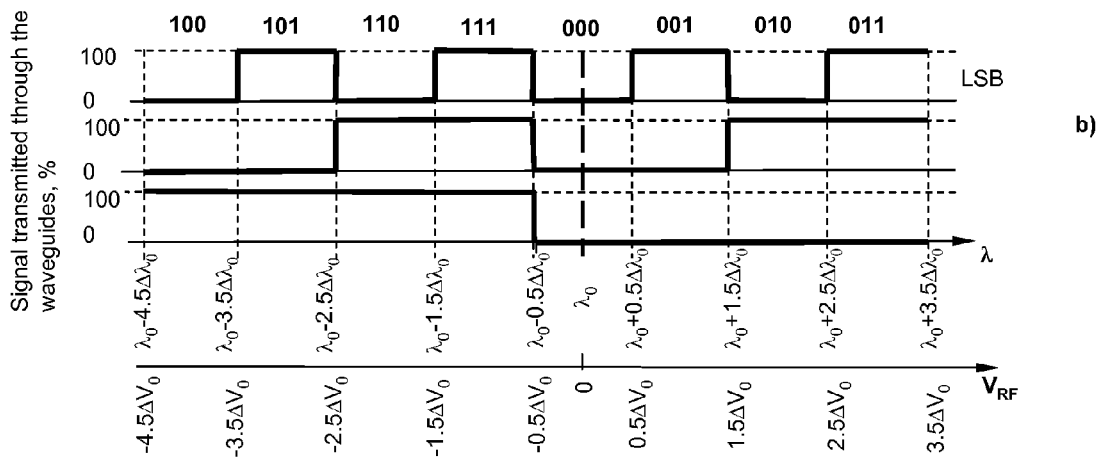
Figure 6. Transmission spectra of gratings recorded in 3 waveguides for 3-bit two's complement encoding.

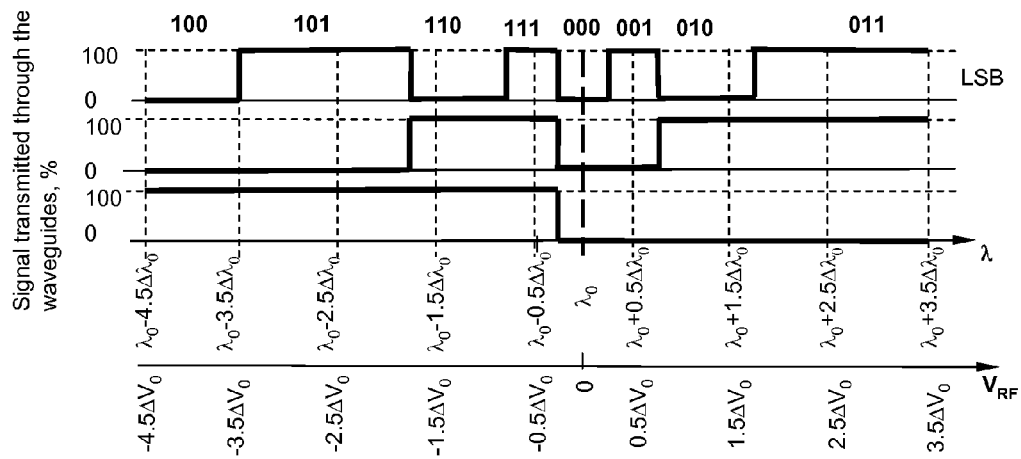
Figure 7. Reflection spectra of periodic, asymmetric gratings recorded in 3 waveguides for 3-bit two's complement encoding with extra resolution around zero.
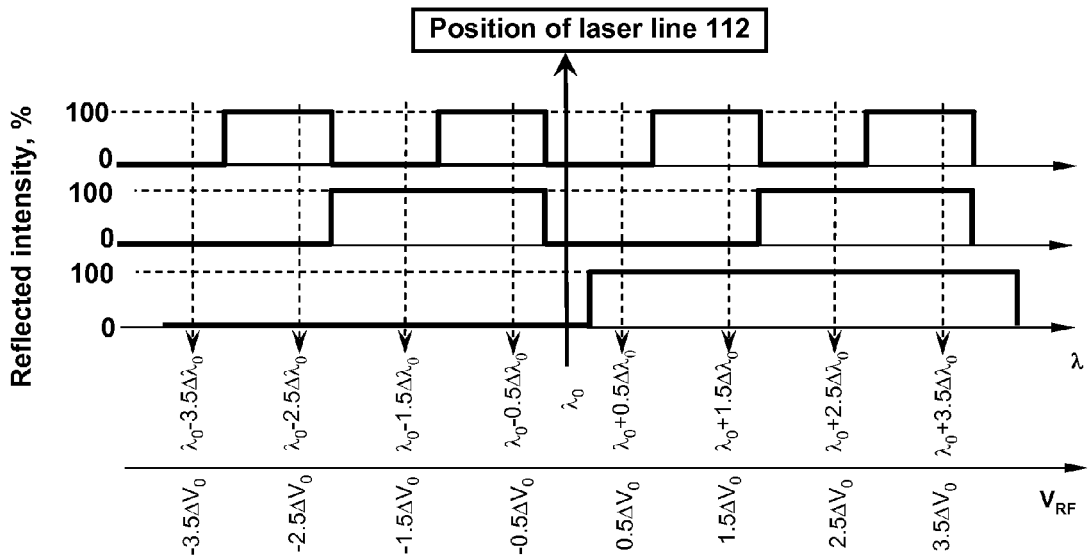
Figure 8. Reflection spectra of aperiodic, asymmetric gratings recorded in 3 waveguides for 3-bit encoding with extra sensitivity around zero.

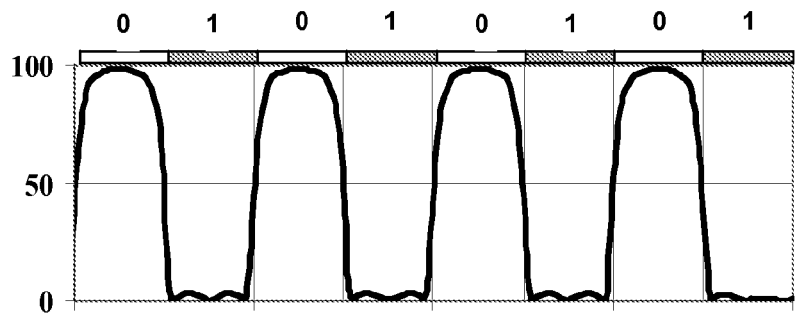
Figure 9a: L = 25 mm, Δn = 5.3×10e-5
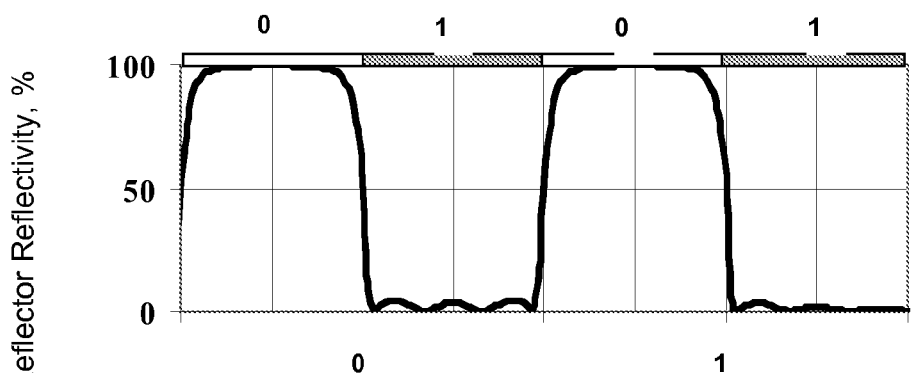
Figure 9b: L = 15 mm, Δn = 1.15×10e-4
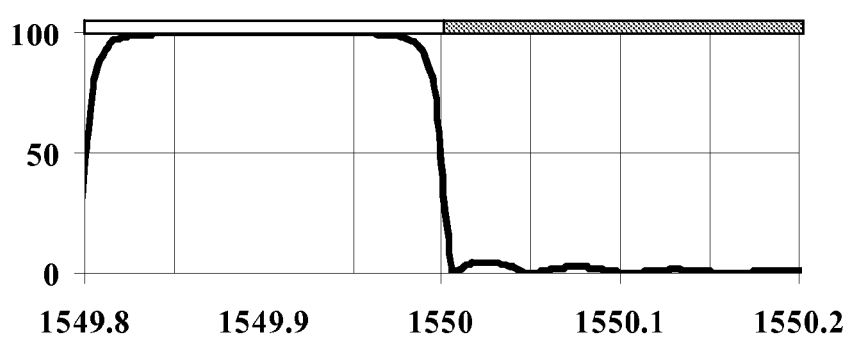
Figure 9c: L = 9 mm, Δn = 2.4×·10e-4
Wavelength, nm
Calculated reflection spectra of reflectors recorded for λ = 1550nm in waveguides of 3-bit binary code digitizer. Sidelobes are 10 times suppressed with reflectors length L and refractive index modulation Δn

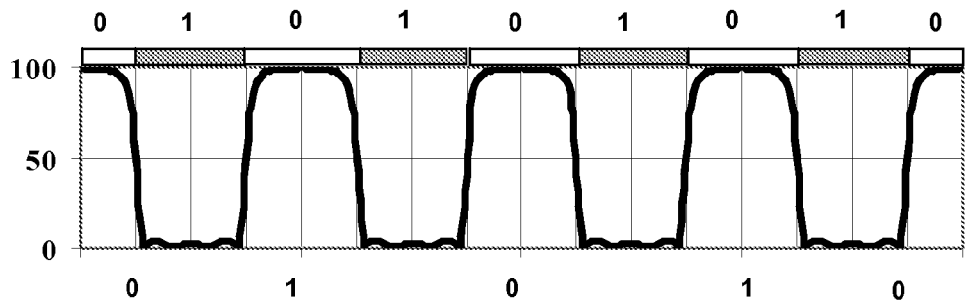
Figure 10a: L = 7.5 mm, Δn = 1.1x10e-4
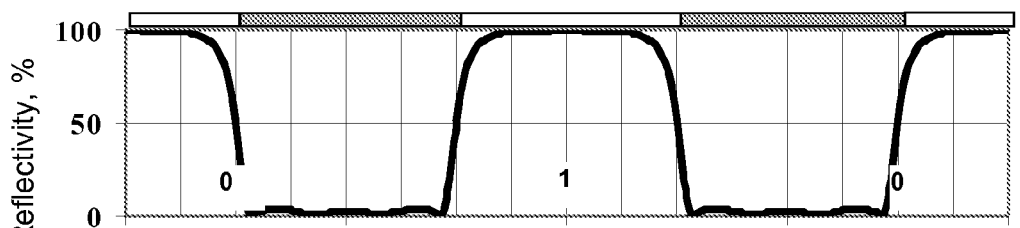
Figure 10b: L = 3.8 mm, Δn = 2.2x10e-4
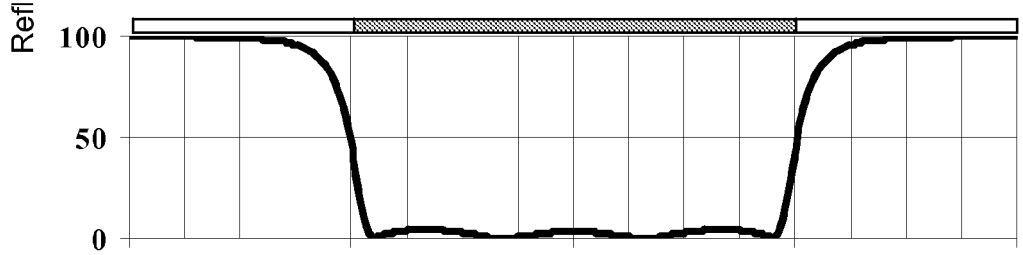
Figure 10c: L = 2 mm, Δn = 4.4x10e-4
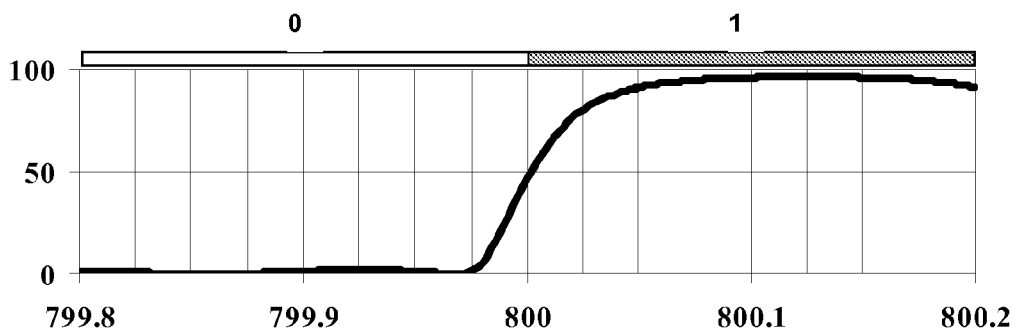
Figure 10d: L = 1.2 mm, Δn = 5.0x10e-4
Wavelength, nm
Calculated reflection spectra of gratings recorded at λ = 780 nm in waveguides of 4-bit Gray code digitizer with reflector length L and refractive index modulation Δn. Sidelobes are 10 times suppressed.

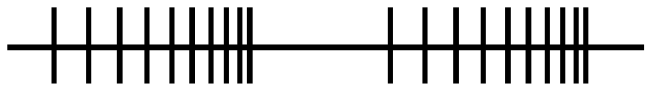
Figure 11a Chirped Gratings. Fabry-Perot like modulator composed of two chirped gratings for multi-peak periodic spectra
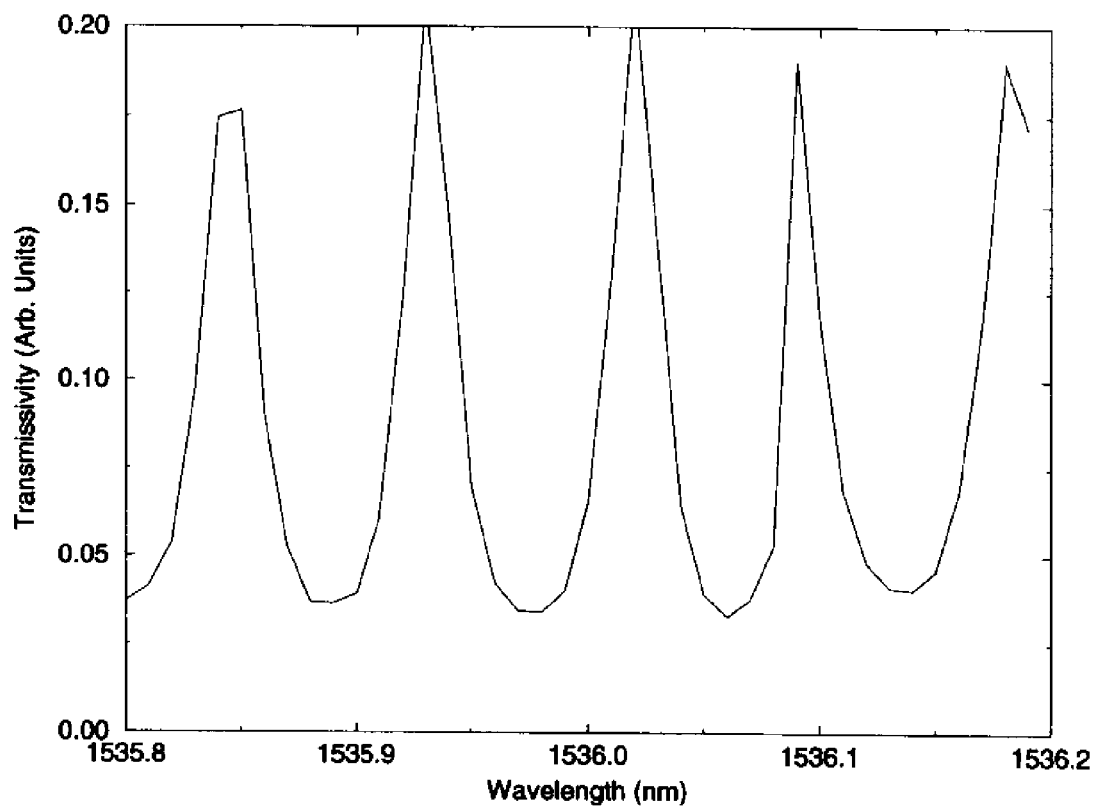
Figure 11b Chirped Grating. Exemplary spectra for Fabry-Perot like modulator composed of two chirped gratings

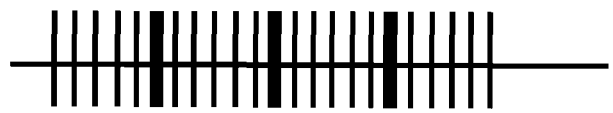
Figure 12a Phase Shifted Grating. Bragg Grating with multiple phase shift regions in stop band
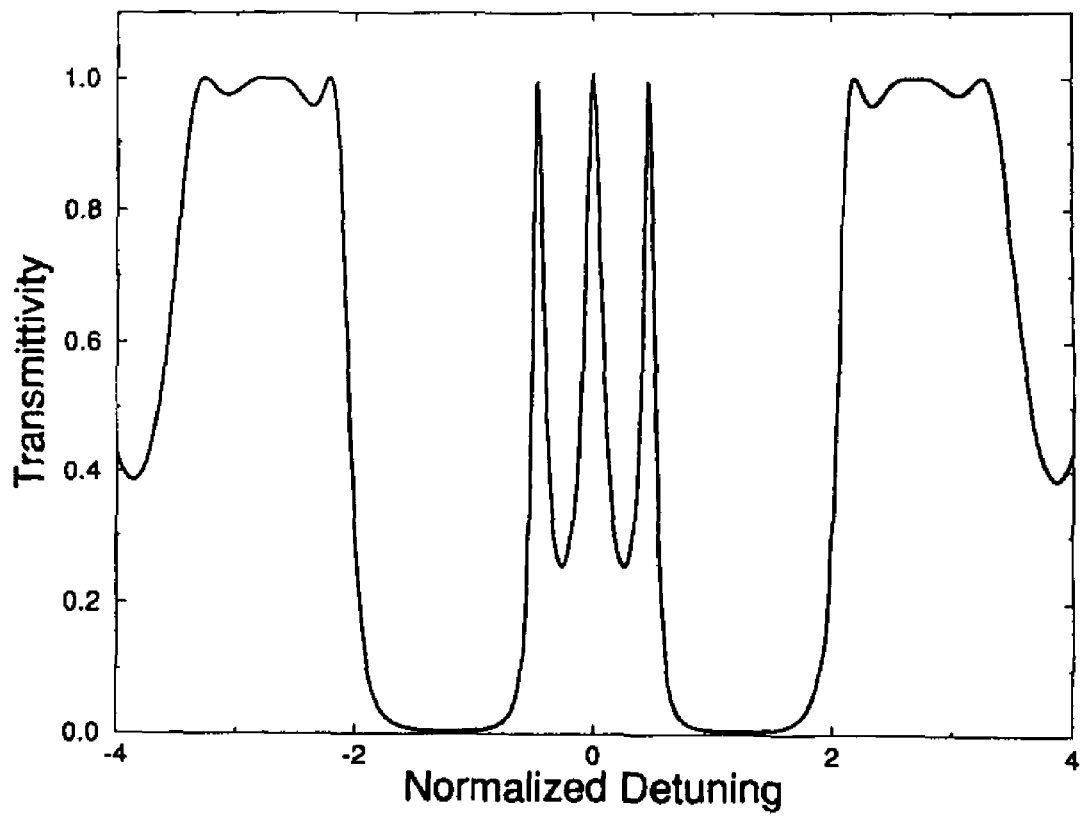
Figure 12b Phase Shifted Grating. Transmission Spectrum for Bragg Grating with three phase shift regions in the stop band

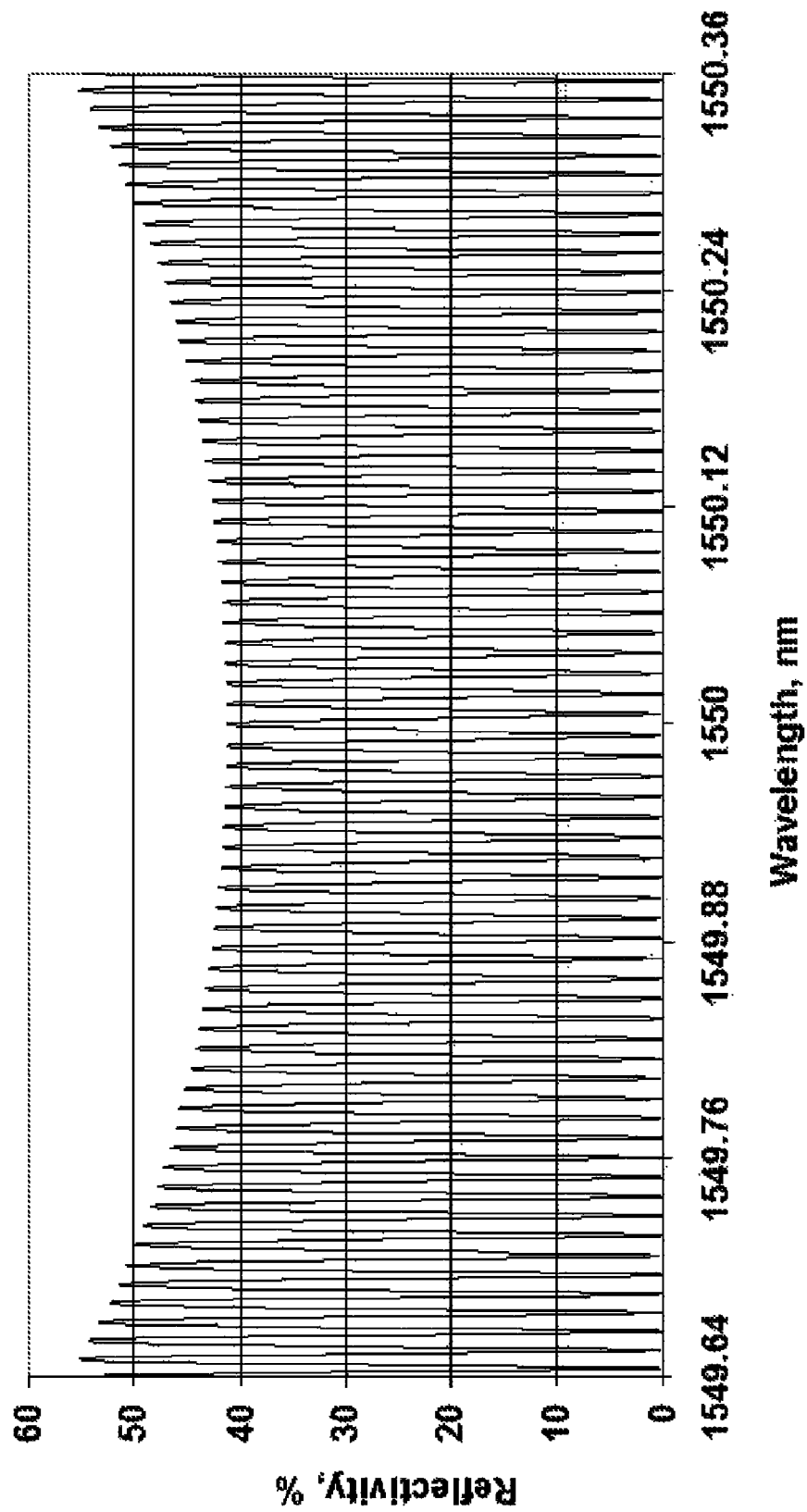
Figure 13a Phase Shifted Grating with 124 phase shift regions in stop band for 8 bit Quantizer

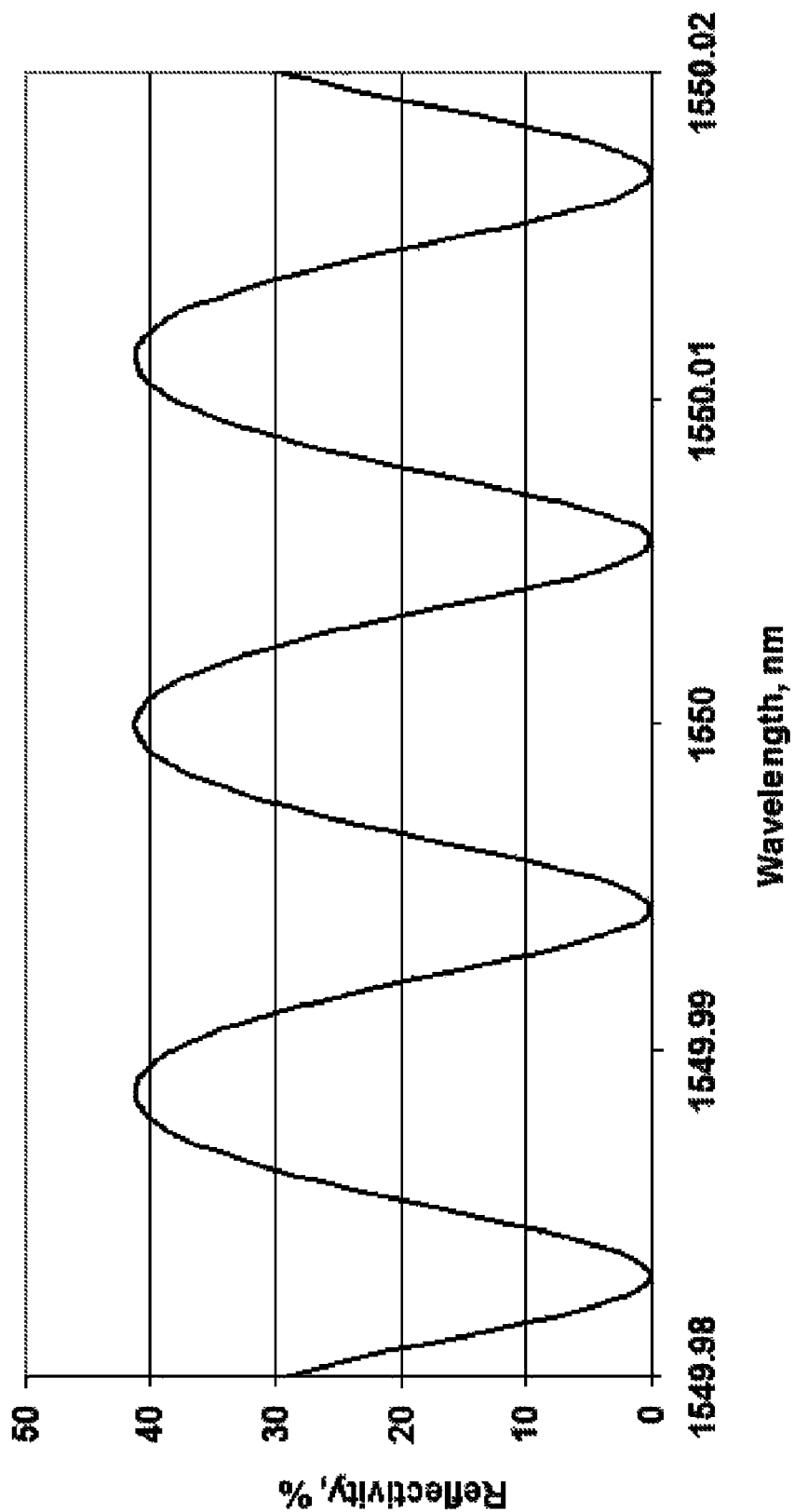
Figure 13b Enlarged View of figure 13a

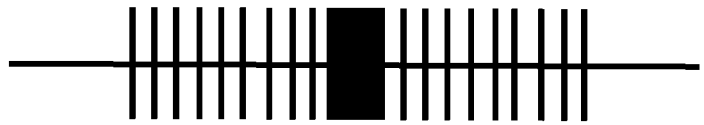
Figure 14a Grating with larger center groove (Asymmetric Grating) or larger index of refraction (Altered Index Grating) in the center.
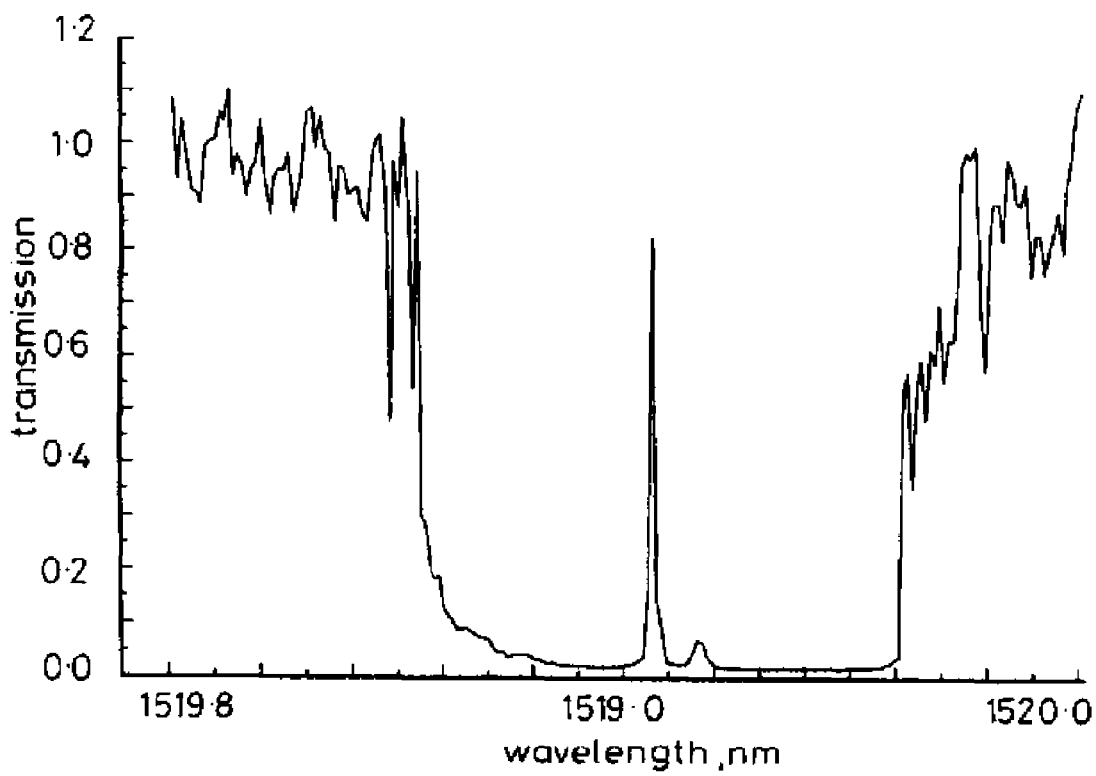
Figure 14b Typical Transmission spectrum for Grating with larger center groove (Asymmetric Grating) or larger index of refraction (Altered Index Grating) in the center

HIGH SPEED PHOTONIC ANALOG TO DIGITAL QUANTIZER

BACKGROUND

Electrical equipment uses ever higher radio frequencies and wider signal bandwidth for wireless communications, imaging, data transmission and other applications. Often this equipment requires a computer to process the signals to extract information or process the signals with other algorithms. This information extraction or processing requires the conversion of the analog radio frequency signals into digital form. Conversion of analog signals into digital generally requires a sample and hold on the analog signal and quantization of the analog signal into a digital one. These conventional analog to digital converters are limited by the bandwidth of the device technology employed and by timing issues. As a result, the conversion of high frequency analog signals in the tens of gigahertz is difficult with present technology. In addition, the noise imparted to the digital signal is proportional to the dynamic range of the quantization device. The greater the resolution of the quantizer, the less noise is added to the system by the conversion from analog to digital signals. Moreover, some applications benefit from encoding the analog signal into Gray code instead of straight binary as a way to add some noise immunity. Still other applications benefit from the analog signal being converted into a two's complement binary number.

The invention described herein allows the quantization of analog signals in the tens of gigahertz range to digital signals using optical encoding where the number of bits is limited primarily by the ability to construct optical reflectors on a plurality of optical waveguides.

G. C. Valley in "Photonic analog-to-digital converters" Optics Express, v15, no. 5 pp 1955-1982, 2007 surveyed the field and concluded that the maximum number of bits that could be obtained is four, based on "An optical analog to digital converter—Design and Analysis" by H. Taylor, IEEE Journal of Quantum Electronics v 15 pp 210-216 incorporated by reference herein in its entirety. Valley concluded Taylor's scheme required too high a voltage for achieving a π-phase shift by the optical modulator. This is commonly known as the $V_\pi$ problem in that the voltage needed to shift the phase multiple times for the Least Significant Bit modulator by π, first is proportional to the input light wavelength and inversely proportional to the cube of the refractive index multiplied by the effective electrooptic coefficient, and second can be large enough to cause the breakdown of the dielectric material separating the electrodes, as well as being difficult to generate because of the high frequency. Moreover, Taylor's scheme is limited to periodic variations in transmission bands because his design relies on interferometric modulators.

The design herein avoids the $V_\pi$ problem of Mach-Zehnder or Fabry-Perot interferometers. By using gratings or other suitable reflectors designed to reflect particular wavelength bands with a reasonable voltage, the need for Mach-Zehnder or Fabry-Perot interferometers is eliminated. The use of gratings also means the design is not limited to periodic variations in transmission bands.

The basics of obtaining spectral shifts with gratings on optical waveguides is described in U.S. Pat. No. 6,640,020 (S. Ionov, Method and Apparatus for Electro-Optic Delay Generation and Optical Signals) incorporated herein by reference in its entirety and "Fabrication and Application of Holographic Bragg Gratings in Lithium Niobate Channel Waveguides" J. Hukriede, D. Runde, D. Kip, Journal Physics D: Applied Physics v36 pp R1-R16, 2003, incorporated herein by reference in its entirety.

While using intensity modulation in photonic analog to digital quantizers is know in the art, using a plurality of cascaded reflection gratings on one waveguide with an encoded spectra that are shifted by application of an electric field to reflect, or not reflect, a laser beam and then detect the reflected light as either a binary 1 or 0, has not been done. The gratings or reflectors herein are used as intensity modulators.

There is a need to quantize high frequency analog signal into high resolution straight binary, Gray coded, or two's complement digital signals to enable further processing of high frequency analog signals.

SUMMARY

The present invention is directed to providing apparatus and methods for converting high frequency analog signals into digital signals. An analog to digital converter 200 in FIG. 1a generally consists of a sample or sample & hold device 220 on the input analog signal and a quantizer 210 to quantize the analog signal into a digital one. The digital signals may be in various forms or encodings such as Gray code, two's complement or straight binary. Sample and sample & hold devices circuits are well known in the art.

The present invention's objective is to quantize an analog RF input signal into straight binary, Gray code, two's complement, or other encoding of digital signals using optical encoding of the input analog electrical signal. As shown in FIG. 1b, the input analog electrical signal 380 is applied to one or more optical encoding channels 320, 330, 340 driven by a laser light source 310. Each optical encoding channel comprises one or more reflectors constructed on an electro-optically sensitive optical waveguide, electrodes, photo detectors, and comparators.

The reflectors constructed on each optical waveguide implement an encoding scheme and may be gratings, chirped gratings, Bragg gratings, Fabry-Perot like structures or other optical filters. The reflection/transmission spectra of the reflectors do not have to be periodic. The reflectors will transmit or reflect light within the waveguide depending on the construction of the reflector and the waveguide material. A person skilled in the art will realize that a reflector constructed on an optical waveguide may be considered to transmit light through the waveguide or to reflect that light depending on the concept of operation. Furthermore, a person skilled in the art will realize that constructing a reflector with a particular reflection spectrum does not preclude that reflector from having a complementary transmission spectrum. The reflectors are designed with a transmission/reflection spectra shifted as a function of applied voltage relative to the fundamental wavelength of the laser light. In the simplest case, each transmission band requires one reflector. The appropriate design of the reflectors depends on the number of reflectors per waveguide, the wavelength bands of light reflected or transmitted, the index of refraction of the waveguide material and the change in index of refraction with electric field.

The input analog signal generates an electric field between the electrodes of an optical encoding channel. The electrodes constructed on the electro-optically sensitive optical waveguide of an optical encoding channel are arranged to impose the electric field in the waveguide material adjacent to or near the reflector. The same electrical input signal is applied to each reflector on an optical encoding channel and cause the reflectors to either reflect or not, depending on the magnitude of the input signal and the design of the reflector. By appropriately designing the reflectors to transmit/reflect the laser light depending on the shift in the transmission spectra, the transmitted optical signal will represent a binary signal where the presence of the transmitted optical signal indicates a logical "1" and the absence indicates a logical "0" or vice versa. The transmission spectra implements a binary encoding of the input signal according to an encoding scheme. The optical signal is directed to the photo detector of an optical encoding channel to convert the optical signal into a digital bit. The collection of bits from a number of optical encoding channels represents a digital word.

In a first method embodiment, an analog signal is converted into a digital output by optically coupling the output of a laser light source into at least one optical encoding channel input. An optical encoding channel comprises a waveguide constructed of electro-optically responsive material, optical reflectors on the waveguide, at least two electrodes, a detector, and generates a bit of the digital output. By stimulating the electrodes with the analog signal such that an electric field is created in the electro-optically responsive waveguide, the laser light from the laser light source will be transmitted or not depending on the shift in transmission spectrum. The transmission spectrum implements an encoding of the analog signal into the bit of the digital output of the optical encoding channel. The first method may be augmented by stimulating the electrodes with a sampled analog input.

In a second method embodiment, a sampled analog signal is converted into a digital output by optically coupling the output of a laser light source into at least one optical encoding channel input. An optical encoding channel comprises a waveguide constructed of electro-optically responsive material, optical reflectors on the waveguide, an optical element, at least two electrodes, a detector, and generates a bit of the digital output. The optical element passes laser light to the waveguide and passes reflected light from the waveguide to the detector. The electrodes are stimulated with the sampled analog signal at the distal end from the optical element. Stimulating the electrodes with the sampled analog signal creates an electric field in the electro-optically responsive waveguide; the laser light from the laser light source will be transmitted or not depending on the shift in reflection spectrum caused by the electric field. The electric field will be a pulse traveling in the opposite direction of the laser light. The reflection spectrum implements an encoding of the analog signal into the bit of the digital output of the optical encoding channel.

DESCRIPTION OF THE DRAWINGS

FIG. 1a shows the components of a generic analog to digital converter.

FIG. 1b shows block diagram for quantizing an analog signal according to the present disclosure.

FIG. 2a is a schematic representation of the analog to digital quantizer of the present disclosure showing the input analog signal applied to the electro-optically responsive waveguide and the detection of the transmitted light as a digital signal. FIG. 2b shows how each bit is determined as function of applied analog voltage and the corresponding transmission spectra. The component designations are the same in all figures as appropriate. E.G. the Narrowband Continuous Wave Laser 110 in FIG. 2a is the same as the Narrowband Continuous Wave Laser 110 in FIG. 3a.

FIG. 2b illustrates the reflection spectra for a three bit binary coded analog to digital quantizer.

FIG. 3a illustrates an alternate embodiment for converting an input analog radio frequency signal into a digital signal.

FIG. 3b shows the reflection spectra for the Gray coded waveguides and reflectors.

FIG. 4 shows an embodiment of the quantizer in FIG. 3a integrated into a communications channel.

FIG. 5 illustrates the transmission spectra of a Gray coded device as a function of wavelength.

FIG. 6 illustrates exemplary spectra for two's complement encoding

FIG. 7 illustrates an exemplary aperiodic spectra with two's complement encoding and extra resolution around zero.

FIG. 8 illustrates an exemplary aperiodic, asymmetric spectra with extra sensitivity around zero.

FIG. 9 shows a sample design for reflection spectra with suppressed sidelobes.

FIG. 10 shows the calculated reflection spectra for four waveguides with gratings for a Gray code quantizer.

FIG. 11a shows the Fabry Perot like modulator implemented as two chirped gratings that can be used to generate multiple reflection/transmission spectra from a single pass of light without a grating for each reflection/transmission band.

FIG. 11b shows the reflection/transmission spectra of the design in FIG. 11a.

FIG. 12a shows an idealized Bragg grating with three additional 180 degree phase shift regions added to create three closely spaced transmission/reflection spectra, shown in FIG. 12b.

FIG. 12b shows the reflection/transmission spectra of FIG. 12a

FIG. 13a shows the scalability of inserting 180 degree phase shifts in gratings through a representative spectra for an 8 bit quantizer.

FIG. 13b shows a close up view of a portion of the spectra in FIG. 13a.

FIG. 14a shows an alternative grating design where a narrow transmission band is placed in the center of a stop band by widening one or more grooves of the grating in particular locations.

FIG. 14b shows the spectra for the design of FIG. 14a.

DESCRIPTION

The present invention will be understood and appreciated more fully from the following detailed description taken in conjunction with the drawings described below. The following description is presented to enable one of ordinary skill in the art to make and use the invention and to incorporate it in the context of particular applications. Various modifications, as well as a variety of uses in different applications will be readily apparent to those skilled in the art, and general principles defined herein may be applied to a wide range of embodiments. This invention may be embodied in many different forms and should not be construed as limited to the embodiments set forth herein. Further, the dimensions and other elements shown in the accompanying drawings may be exaggerated to show details. The present invention should not be construed as being limited to the dimensional relations shown in the drawings, nor should the individual elements shown in the drawings be construed to be limited to the dimensions shown. Thus the present invention is not intended to be limited to the embodiments presented, but is to be accorded the widest scope consistent with the principles and novel features disclosed herein.

In the following description, numerous specific details are set forth in order to provide a more thorough understanding of the present invention. However, it will be apparent to one skilled in the art that the present invention may be practiced without necessarily being limited to specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All features disclosed in this specification, (including any accompanying claims, abstract, and drawings) may be replaced by alternative features serving the same, equivalent or similar purpose, unless expressly stated otherwise. Unless expressly stated otherwise, each feature disclosed is one example only of a generic series of equivalents or similar features.

Any element in a claim that does not explicitly state "means for" performing a specified function, or "step for" performing a specific function, is not to be interpreted as a "means" or "step" clause as specified in 35USC Section 112, Paragraph 6. In particular, the use of step of or act of in the claims herein is not intended to invoke the provisions of 35USC Section 112 Paragraph 6.

One embodiment is shown in FIG. 1b. The input analog electrical signal 380 is applied to one or more optical encoding channels 320, 330, 340 driven by a laser light source 310. The laser light source 310 may be narrow band or broadband, continuous-wave or pulsed and may have one or more fundamental or central wavelengths 312. Each optical encoding channel 320, 330, 340 encodes one bit of the quantizer output according to an encoding scheme. An optical encoding channel comprises one or more reflectors constructed on an electro-optically sensitive optical waveguide, electrodes, photo detectors, and comparators. The design and construction of the reflectors captures the encoding scheme by allowing the transmission/reflection of the laser light in the optical encoding channel according to the desired encoding scheme. Note that in FIG. 1b each optical encoding channel may be driven by a unique wavelength of laser light. As such the design of each optical encoding channel has to accommodate the particular wavelength of laser light.

Another embodiment (100) of the invention, shown in FIG. 2a, illustrates the basic principal of operation. The device consists of a narrowband continuous wave (CW) laser 110 driving a plurality of optical encoding channels with laser light 112. Each optical encoding channel (1, 2 or 3) consists of an electro-optically sensitive waveguide 160, each with reflectors 120, photodetector 130, electrodes 170, amplifier 140, and comparator 150. Input voltage 180 is sampled by sampler 185, if necessary, and applies an electric field across the electro-optically sensitive waveguide 160 of an optical encoding channel. The same sampled input voltage is applied to each optical encoding channel. If the analog input signal is a current instead of a voltage then the input signal is converted to a voltage (not shown but well known in the art) before being sampled by the sampler 185 and applied to the waveguide 160. The sampler 185 may be a necessary element for high frequency operation and if reflectors constructed as gratings will be used. The applied electric field changes the index of refraction of the waveguide 160. In response, the reflectors 120 will shift the transmission/reflection spectra causing either transmission of the input narrowband continuous wave laser light 112, or not, depending on the magnitude of the input electric field. The transmitted narrowband laser light 115 is detected with photodetectors 130. The presence or absence of the transmitted light represents a binary one or zero, respectively. The output signal from the photodetectors 130 is amplified by amplifiers 140, if necessary. Comparators 150 convert the comparator input into a digital signal. The detected signals from all the waveguides 160 form the digital word 190. The digital word 190 represents the encoding of the analog input 180.

The encoding scheme or the optical signal transmission within an optical encoding channel, as a function of input voltage and the associated shift in transmission wavelength, is shown in FIG. 2b. A three bit encoder shown in FIG. 2a requires 4 transmission bands on the Least Significant Bit (LSB) waveguide 160. Hence a reflector 120 is built with 4 individual reflector elements 122, 124, 126, and 128. The reflector elements 122, 124, 126, and 128 are designed and constructed for each transmission band such that the application of the associated value of input voltage 180 shifts that band to encompass the wavelength of the narrowband continuous wave laser light 112. The bands are chosen per FIG. 2b. By placing the reflectors 120 on the waveguide 160, the associated transmission spectra implements a binary encoding of the applied analog voltage according to the encoding scheme.

Electro-optically active materials are well known in the art. However, for use in the present invention, the electro-optically active material must be such that reflectors 120 can be formed on it by etching grooves or by refractive index modification. Also, the change in index of refraction with respect to the electric field should be as large as possible, so that the magnitude of the electric field can be kept as small as possible. Non-limiting materials that provide such characteristics include lithium niobate ($LiNbO_3$), lithium tantalate ($LiTaO_3$), lithium niobate doped with titanium, and lithium niobate doped with iron.

The dimensions of a waveguide are roughly 4-5 cm long and have an electro-optically responsive region ~3 microns deep and ~8 microns wide the length of the waveguide 160. The light propagates lengthwise.

The means for generating an electrical field across the electro-optically active material may be provided by electrodes 170 bracketing the electro-optically active material. The operation generally is dependent on the orientation of the electric field with respect to the crystallographic axes of the waveguide material. To minimize the magnitude of the applied voltage for a given electric field the electrodes 170 may be placed on the top and bottom of the waveguide 160. Electrodes 170 could be placed on the sides or on the ends as long as the necessary electric field can be generated, roughly 10 kV/cm in the proper orientation with respect to the crystallographic axes. More than two electrodes 170 may be used.

As the electric field between the electrodes 170 changes, the index of refraction within the electro-optically active material will change. The change in index of refraction is generally proportional to the magnitude of the electric field. The change in the index of refraction results in a shifting of the transmission spectra of the gratings or reflectors 120.

In another embodiment, the quantizer of FIG. 2a is modified by using an aperiodic reflection spectra as shown in FIG. 7 instead of the periodic reflection spectra shown in FIG. 2b. The advantage of using reflectors capable of an aperiodic spectra is shown in this embodiment. Comparing the resolution of the spectra in FIG. 2b to that in FIG. 7 shows a quantizer with the reflection spectra of FIG. 7 has greater resolution around zero than would be available to quantizers limited to periodic reflection spectra as available with interferometric designs.

In a similar embodiment, the quantizer of FIG. 2a is modified by using a periodic but asymmetric transmission/reflection spectra as shown in FIG. 8. The advantage of using the spectra in FIG. 8 is the increased sensitivity around zero. A smaller change in analog signal will cause the LSB to toggle.

The embodiment 100 shown in FIG. 2a will work for analog signal inputs up to a few gigahertz. As the frequency increases the pulse characteristic of the sampled input analog signal becomes more limiting. However, the pulse nature of the sampled input voltage 180 can be exploited to create a higher frequency analog to digital quantizer.

Higher frequencies may be accommodated with the embodiment shown in FIG. 3a. By having the input RF pulses 182 shown in FIG. 3a propagate opposite the direction of the input narrow band continuous laser light 112, the propagating RF pulse 182 in effect collects beamlets (small reflections) created by the momentary shift in the refractive index of the waveguide 160 adjacent to the grating or reflector element 128, as caused by the electric field of the RF pulse 182. The shift in index of refraction of the waveguide portion in the vicinity of that RF pulse is in proportion to the applied voltage. If this change in index of refraction occurs where a reflector element 122-128 has been placed and while the narrowband CW laser signal 418 is present, then the narrowband CW laser light 418 may experience a reflection depending on the spectral shift and generate a beamlet. The reflected optical signal 420 is now a pulse traveling in the same direction as the RF pulse 182. The high frequency RF pulse 182 is much shorter than the length of a reflector element 122-128. As the RF pulse propagates along the electrode 170, with the reflected optical pulse 420, it will encounter each groove of each reflector element 122-128 sequentially. Each groove causes a reflection or beamlet of the narrowband CW laser light 418, coinciding with the reflected optical pulse from the prior groove. For these beamlets to add constructively at the end of the reflector element 122-128, the beamlet from the first groove encountered in the grating or reflector element 128 (for example) must reach the end of the reflector element 128 at the same time as the RF pulse 182.

Conceptually, as the RF pulse propagates along the electrode it accumulates voltage-modified reflected optical pulses or beamlets much like a snow plow collects drifts as it moves along. These optical pulses interfere constructively to provide a detectable signal at the photodiodes 130 and comparators 150 which form the digital word. By operating a plurality of optical encoding channels 422 in parallel, one per bit and each with its own reflectors 120, the input RF voltage 180 is converted into a digital signal 190.

The frequency range for the embodiment shown in FIG. 3a depends on the construction and number of individual reflector elements 122-128 comprising reflector 120 on a waveguide 160. The more reflector elements comprising the reflector 120, the longer the waveguide 160 and the lower the frequency of the input analog signal. The optical encoding channels 422 are numbered 1, 2, 3 and 4 in FIG. 3a. Each optical encoding channel in FIG. 3a includes the same components as in FIG. 2a, ie a waveguide 160, reflectors 120, electrodes 170, photodetectors 130 and comparators 150. However, each optical encoding channel of FIG. 3a includes additional components: an optical element 410 and an optical connection 424. The optical connection 424 connects the optical element 410 and the photodetector 130. The waveguide 160 and reflectors 120 are the same as in the first embodiment shown in FIG. 2a. The waveguide 160 is built with reflectors 120 and electrodes 170 as in FIG. 2a. The reflector is designed to reflect the narrowband CW laser light 112 by shifting the spectra with the applied voltage. As in the embodiment shown in FIG. 2a, a reflector element (122, 124, 126 or 128) is needed in FIG. 3a for each wavelength band to be reflected on each waveguide 160.

The reflected light in each waveguide, if any, passes through means for directionally coupling the reflected optical pulses to the photodetectors and comparators. The optical element 410 for directional coupling may be a fiber optic circulator, beam splitter, directional coupler, or equivalent device. The CW laser light enters the input 412 of the optical element and leaves the direct output 414. The direct output 414 of the optical element 410 is connected to the waveguide. The reflected pulse from the waveguide enters the optical element 410 (at the direct output 414) and leaves by way of the indirect output 416. The indirect output 416 of the optical element 410 is connected to the input of photodetector 130 by the optical connector 424. The output of the photodetector 130 is connected to the input of the comparator 150. Each comparator 150 provides one bit of a digital word 190. The output of the comparators 150 is a digital word 190 representing the analog to digital quantization of the input analog voltage 180. Note that the input voltage signal 180 is sampled by the sampler 185 to generate the pulse 182. Note that the digital word 190 has to be sampled in synchronization with the sampled voltage pulse 182 reaching the end of the waveguide 160.

The sampler 185 has to operate at higher frequencies than the quantizer as a whole. If the input analog signal has a bandwidth of 10 GHz and ten samples per period are required then a sample is needed every 10 ps (pico seconds). The width of a sample has to be approximately a tenth of the sample frequency or in this case, a sample width of 1 ps. A sampler capable of providing 1 ps wide samples can be built of a photo-conductive switch driven by a mode locked laser that generates the required pulses.

The high frequency RF analog to digital quantizer 400 has a requirement in that the propagation speed of the RF pulse 182 has to nearly match the propagation speed of the reflected light pulse. The propagation speed of the RF pulse 182 and that of the optical pulse have to be near enough such that the initial optical pulse generated by the RF pulse first traveling over the reflector 128 has to exit the reflector 128 near the time the last optical pulse is leaving the reflector 128 for the optical pulses to constructively interfere. One consequence is that the acceptable difference in propagation speeds between that of the RF pulse 182 and the reflected optical pulses is dependent on the length of the reflector 128. If the difference in propagation speeds is too great for the length of the reflector then the first optical pulse will leave the reflector before or after later optical pulses can constructively interfere to produce a detectable signal.

Another requirement on the high frequency RF analog to digital quantizer 400 is that the sampled input RF voltage 182 has to have a small duty cycle <50% to enable the recovery of light energy stored in the grating during the time between the RF pulses. Lower duty cycle will result in practically total recovery of the light energy transmitting through the grating and in high reproducibility of intensity of reflected optical pulses.

Another embodiment shown in FIG. 4 extends the design shown in FIG. 3a by adding an optical communication link between the outputs 416 of the optical elements 410 indirect output and the photodetectors 130. In addition, the narrowband CW laser 110 is replaced with a plurality of narrow band CW lasers, each generating a particular wavelength. The optical communication link consists of a multiplexer 510, a free space or fiber optic link 530 and de-multiplexer 540. The multiplexer 510 multiplexes the individual wavelengths passing through the optical connections 424 to the optical link 530. On receipt, the de-multiplexer 540 inverts the multiplexing of 510.

Design of Reflector Elements as Gratings

The layout, construction and placement of the reflector elements 122-128 is well known in the art. In one embodiment, each waveguide 160 needs a set of reflectors 120 comprised of reflection elements 122-128, one for each reflection band and a waveguide 160 for each bit. The reflectors 120 may be implemented as a set of gratings where each grating or reflection element 122-128 corresponds to a reflection band. Other embodiments of reflectors are possible such as: chirped gratings that act similar to a Fabry-Perot reflector (Chirped Gratings); Bragg gratings with 180 degree phase shifts in an otherwise uniform grating (Phase Shifted Gratings); Bragg gratings with selected grooves wider or narrower than the other grooves (Asymmetric Gratings); Bragg gratings with the index of refraction in the waveguide material altered locally for selected grooves compared to the index of refraction for the remaining grooves (Altered Index Gratings); Bragg gratings with two or more overlapping gratings recorded (Overlapped Gratings).

The resolution and, hence, the number of bits of the analog to digital quantizer is limited by the available change in index of refraction, which drives the available shift in transmission/reflection spectra and limits the construction of the reflectors 120. As the number of bits increase for a fixed available total wavelength shift of the transmission/reflection spectra, the spectral width of the reflector element 122-128 decreases and becomes harder to construct. For a given available change in wavelength $\Delta\lambda$, and N desired bits, a straight binary analog to digital quantizer will have as many as $2^{N-1}$ spectral bands. The width of each band is $\Delta\lambda/2^N$. The details of the construction of reflectors as gratings is well known in the art and can be found in Coupled Wave Theory for Thick Hologram Grating by Herwig Kogelnik, Bell System Technical Journal, Vol 48, November 1969, Number 9, pages 2909-2951, incorporated herein by reference in its entirety.

The fundamental dimension of a reflector 120 implemented as a grating is the period of each individual groove in reflection elements 122-128. The reflection of a Bragg grating having a spatial period or pitch of $\Lambda$ reaches its maximum at the wavelength $\lambda$ satisfying the Bragg condition. For normal incidence of beam, this condition is:

$$\lambda = 2\Lambda n \quad (1)$$

where n is the index of refraction of the grating media.

The change in index of refraction ($\Delta n$) as a function of applied electric field (E) is $$\Delta n = n^3 r E / 2 \quad (2)$$

where r is the relevant electro-optical coefficient.

To generate an electric field across the waveguides 160 the electrodes 170 may be developed on opposite sides of the waveguides 160 at the location of the reflectors 120 as shown in FIG. 2a and connected to an analog voltage source 180 or to the sampled voltage 187. As the electric field between the electrodes 170 changes, the refractive index within a waveguide 160 will change resulting in the spectral shift of the reflector 120 by the designed amount. The spectrally shifted reflectors 120 now causes the light from the narrowband CW laser light 112 to reflect or not. The electrodes 170 are not limited to two per waveguide 160 or to bracketing the reflectors 120. The prime requirement is the generation of a specifically oriented electric field within the waveguide 160 such that the index of refraction of the waveguide material adjacent to the reflector 120 is changed.

Differencing (1), one can find that the spectral shift is proportional to the change in refractive index which is generally proportional to the magnitude of the electric field E or to the change in applied voltage V:

$$\Delta\lambda = 2 \cdot \Lambda \cdot \Delta n = \Lambda n^3 r E = k \Delta V \quad (3)$$

where k is a proportionality coefficient dependent on material parameters and practical construction of the reflector 120. The unit increment in voltage is the full scale range of input voltage quantized for the number of bits N.

$$\Delta V = (V\max - V\min)/2^N \quad (4)$$

If the physical length of a reflector 120 implemented as a grating for a given spectral bandwidth is too long then the reflector 120 can be implemented as several consecutive coherently combined gratings.

Using the above equations results in the designs shown in FIGS. 9 and 10. Comparing the grating parameters of FIG. 9 with those of FIG. 10, one can see that to get the same reflection spectra in the case of shorter wavelength light (FIG. 10), much shorter gratings can be used for the reflectors 120, while the refractive index modulations have to be greater. The rectangular spectral shapes are not the limiting condition for device implementation. However, rectangular spectral features serve to also perform a comparator function. Smooth spectral shapes of grating spectra can be used to facilitate the grating recording design for reflectors 120. Thus, overlapping grating recording, different spectral intervals, and different spectral shapes of gratings can be used to satisfy the required parameters for the reflectors 120. The number of bits drives the number of spectral bands and the number of spectral bands that can be constructed on a waveguide 160 of finite length controls the number of bits.

Modifications for Gray Coded and Two's Complement Reflection Spectra

FIG. 5 shows the transmission pattern as a function of wavelength for a four bit Gray coded analog to digital quantizer. Note the Gray coded pattern requires about half the reflectors 120 on the Least Significant Bit waveguide 160 of a straight binary encoding.

FIG. 6 shows the transmission spectra that implements two's complement encoding.

Eight Bit Example of Gray Coded Reflection Spectra

An analog to digital quantizer with a larger number of bits requires a larger number of spectral maximums developed over the length of the waveguide 160. For an N-bit Gray code analog to digital quantizer the waveguide 160 constructed for the least significant bit must have $2^N/4 = 2^{N-2}$ spectral maximums within the available change in wavelength. An 8-bit analog to digital quantizer requires 64 spectral maximums. Consider the example of Ti:LiNbO$_3$ waveguides; according to the U.S. Pat. No. 6,640,020 (S. Ionov, "Method and apparatus for electro-optic delay generation of optical signals," U.S. Pat. No. 6,640,020, October 2003), the refractive index change $\Delta n$ of $\sim 5 \cdot 10^{-4}$ can be reached in a 3 microns thick Ti:LiNbO$_3$ waveguide at 5V applied voltage. This means that the total spectral shift available at wavelength of 1550 nm and voltage swing of $\pm 5$V is:

$$\Delta\lambda = \frac{\Delta n}{n}\lambda = \pm \frac{5 \cdot 10^{-4}}{2.15} 1550 \text{ nm} = \pm 0.36 \text{ nm}. \quad (5)$$

In this example, the spectral distance between the maximums has to be 0.72 nm/64=0.011 nm; therefore, the spectral width of every single maximum has to be half of this or ~0.005 nm. To design a waveguide 160 for the least significant bit of an 8-bit quantizer, with the reflectors 120 implemented as gratings, it is necessary to record 64 gratings with a length of 60-80 mm each and position them very accurately relative to each other in the spectral domain. This is very difficult to realize practically. 64 gratings at 70 mm each requires a waveguide of 448 cm. However, a Fabry-Perot approach can be used to reduce the length of the waveguide 160 when periodic transmission/reflection spectra are needed.

Fabry-Perot modulators have been used in quantizers (see C. L. Chang and C. S. Tsai, Electro-optic analog to digital converter using channel waveguide Fabry-Perot modulator array, Applied Physics Letters 43(1), July 1983, incorporated herein by reference in its entirety). These Fabry-Perot modulators are multiple pass devices in that the light in the waveguide reflects multiple times before passing through. This is in contrast to the present disclosure which uses a single pass through the modulator. As such, Chang's Fabry-Perot modulators are ill suited for the application shown in FIG. 2a which requires one pass of the light 112 or for the application shown in FIG. 8a which requires one pass of the reflected light 420. However, a Fabry-Perot like modulator can be built of two chirped gratings and offers an alternative.

G. E. Town, et al. (G. E. Town, K. Sugden, J. A. R. Williams, I. Bennion, S. B. Pool. "Wide-band Fabry-Perot-like filters in optical fiber," IEEE Photonics Technology Letters, v. 7, no. 1, pp. 78-80, 1995, herein incorporated by reference in its entirety) showed that two identical linearly chirped gratings recorded at a definite distance from each other in fiber resulted in a spectral response in transmission similar to a Fabry-Perot resonator formed by two partially transmissive plane mirrors. The authors have indicated that the phase response of this structure as a function of optical frequency was modified by a single pass through the two chirped gratings, as opposed to a Fabry-Perot modulator which generates the phase response by multiple passes. Therefore, such a modulator can be used for applications requiring many periodic spectral maximums built on the waveguide. To satisfy these requirements, one can use a low finesse resonator consisting of two identical gratings with chirps greater than 1 nm separated by a distance L providing the example spectral distance between maximums of 0.011 nm. For the above-mentioned example, one can find:

$$L = \frac{\lambda^2}{2(\Delta\lambda)n} = \frac{(1.55)^2}{2 \cdot (1.1 \cdot 10^{-5}) \cdot 2.15} \, \mu m \approx 5 \cdot 10^4 \, \mu m \text{ or } 50 \text{ nm}. \quad (6)$$

FIG. 11a shows a Chirped Grating composed of two chirped gratings separated by L. FIG. 11b shows an exemplary spectra for the a Chirped Grating per G. E. Town, et al. (G. E. Town, K. Sugden, J. A. R. Williams, I. Bennion, S. B. Pool. "Wide-band Fabry-Perot-like filters in optical fiber," IEEE Photonics Technology Letters, v. 7, no. 1, pp. 78-80, 1995, herein incorporated by reference in its entirety). Finesse is a figure of merit indicating the sharpness of the transmission peaks. A low finesse resonator has broader peaks than a high finesse resonator.

Thus, a Fabry-Perot-like structure on an optical waveguide 160 with a total length of ~50-60 mm should provide 64 maximums over the required spectral interval for encoding the least significant bit of 8-bit digitizer. This compares favorably with a design using 64 individual gratings with an overall length of 448 cm described above. The same approach allows designing the next least significant bit of the encoder but with a fewer number of maximums.

An alternative reflector for an eight bit encoder can be implemented with a phase shifted grating as shown in idealized form in FIG. 12a. This grating has three 90° phase shifts to create a transmission region in a stop band. An exemplary transmission spectrum for such a phase shifted grating is shown in FIG. 12b per G. P. Agrawal, et al. (G. P. Agrawal, S. Radic. "Phase-shifted fiber Bragg gratings and their application for wavelength demultiplexing," IEEE Photonics Technology Letters, v. 6, no. 8, pp. 995-997, 1994, herein incorporated by reference in its entirety). FIG. 13a shows the reflection spectrum of the Phase Shifted Grating of an optical encoder built of 124 90 degree phase shifts in a 45 mm waveguide on Ti:LiNbO$_3$. The design uses 65 maximums over +/−0.36 nm spectrum.

Another alternative reflector for an eight bit encoder can be implemented with an asymmetric grating or altered index grating as shown in idealized form in FIG. 14a. These designs can be developed by raising the general refractive index at a certain region in a grating. An exemplary transmission spectrum for such gratings is shown in FIG. 14b per J. Canning, et al. (J. Canning, M. G. Sceats. "π-phase-shifted periodic distributed structures in optical fibres by UV postprocessing," Electronics Letters, v. 30, no. 16, pp. 1344-1345, 1994, herein incorporated by reference in its entirety).

Realizable Reflection Spectra

The reflection spectra of the reflectors 120 implemented as gratings shown in FIGS. 2b, 3b, 5, 6, 7, 8 have idealized rectangular shapes for explanatory purposes. Of course, rectangular spectral shapes are preferable because a much smaller change in voltage is needed to switch between 0 and 1, thereby serving the function of a comparator 150. As physically implemented, the above-mentioned spectra will have smooth shapes with large sidelobes which can influence the proper operation of the quantizer. However, the sidelobes can be attenuated.

For reflectors 120 implemented as Bragg gratings, they can be recorded in such a way that their spectral shapes will be close to rectangular with suppressed sidelobes. The rate of transmission/reflection rise is usually controlled by the amplitude of the grating refractive index modulation while the intensity of sidelobes can be controlled by recording apodized gratings where the grating efficiency is tapered smoothly from minimum to maximum on the grating edges. In effect, the spectral response of the grating is not rectangular but has rounded corners. The result is the reflected pulse has lower sidelobes.

The calculated reflection spectra of reflectors 120 implemented as gratings recorded in Ti:LiNbO$_3$ waveguides with 10 times suppressed sidelobes are shown in FIG. 9a-c and FIG. 10a-d. They are analogous to the spectra in FIG. 2b and FIG. 5 respectively. The grating parameters used in these calculations are indicated in the captions. The spectral shapes shown in the FIGS. 9a-c are close to rectangular. However, high refractive index modulations Δn or large lengths of gratings L are required in these cases. The last circumstance results in a long total length of waveguide for the least significant bit. A reflector 120 implemented as four gratings of 25 mm each means a waveguide 160 of at least 10 cm. Of course, if several long gratings with low refractive index modulations are needed to implement a reflector 120, they can be recorded as overlapping gratings to shorten the total length of the waveguide 160.

Next, the calculations of spectra shown in FIG. 9a-c were done for different wavelengths to demonstrate the influence of laser wavelength on the required grating parameters when the reflectors 120 are implanted as gratings. One can see that to get the same reflection spectra in reflectors 120 implemented as gratings, as in FIG. 9a-c but with shorter wavelength light (FIG. 10a-d), much shorter gratings can be used while the refractive index modulations have to be higher.

From the foregoing description, it will be apparent that the present invention has a number of advantages, some of which have been described herein, and others of which are inherent in the embodiments of the invention described or claimed herein. Also, it will be understood that modifications can be made to the device and method described herein without departing from the teachings of subject matter described herein. As such, the invention is not to be limited to the described embodiments except as required by the appended claims.

What is claimed is:

1. An analog to digital quantizer with an analog input signal and a digital output comprising:
   a laser light source with an output of laser light;
   at least one optical encoding channel, comprising one or more cascaded reflectors constructed on an optical waveguide responsive to an electric field, a light input, an analog signal input, and a bit of the digital output;
   wherein the laser light source output of laser light is coupled to the light input of the optical encoding channel and the analog input signal is coupled to the analog signal input of the optical encoding channel;
   wherein the optical encoding channel encodes the analog input signal into a bit of the digital output according to a shift in transmission spectrum of the cascaded reflectors caused by the electric field generated from the analog input signal.

2. The quantizer of claim 1 wherein the optical waveguide is constructed of a material comprising lithium niobate doped with titanium.

3. An analog to digital quantizer with an analog input signal and a digital output comprising:
   a laser light source with an output of laser light;
   at least one optical encoding channel;
   wherein each at least one optical encoding channel comprises:
      an optical waveguide constructed of an electro-optically responsive material with an input and an output;
      a photodetector with an input and an output,
      whereby the photodetector converts input laser light into an output bit of the digital output;
      the laser light source output is optically coupled to the input of the optical waveguide and the output of the optical waveguide optically coupled to the input of the photodetector;
   each optical waveguide further comprising:
      at least one reflector having a transmission spectrum,
      at least two electrodes arranged to impose an electric field on the electro-optically responsive material adjacent to the reflector in response to the analog input signal;
      wherein the electric field causes a shift in the transmission spectrum;
      wherein the shift in transmission spectrum allows the laser light to pass, or not,
      through the optical waveguide output according to an encoding scheme.

4. The quantizer of claim 3 wherein the at least one reflector comprises one or more of a grating, a distributed Bragg grating, a chirped grating, a phase shifted grating, an asymmetric grating, an altered index grating or a Fabry-Perot like structure.

5. The quantizer of claim 3 wherein the encoding scheme comprises one of a straight binary, Gray code, two's complement encoding, an encoding scheme with extra resolution when the analog input signal is zero or an encoding scheme with extra sensitivity when the analog input signal is zero.

6. The quantizer of claim 3 wherein the electro-optically responsive material comprises lithium niobate doped with titanium.

7. The quantizer of claim 3 wherein the laser light source is narrowband continuous wave laser.

8. The quantizer of claim 3 further comprising a sampler wherein a sampled analog input signal generates the electric field.

9. An analog to digital quantizer with an analog input signal and a digital output comprising:
   a sampler with an input and an output;
   wherein the analog input signal is connected to the sampler input and the output of the sampler is a sampled voltage;
   a continuous wave laser light source with an output of laser light;
   at least one optical encoding channel;
   each at least one optical encoding channel comprising:
      an optical element with an input, a direct output and a reflected output;
      an optical waveguide with an input, constructed of an electro-optically responsive material;
      a detector with an input and an output wherein the detector converts input light into a bit of the digital output;
      the laser light source output optically coupled to the input of the optical element;
      the direct output of the optical element optically coupled to the input of the optical waveguide and the reflected output of the optical element optically coupled to the input of the detector;
   each optical waveguide further comprising:
      at least one reflector with a length and a reflection spectrum constructed on each waveguide;
      at least two electrodes each with a distal end and a proximate end;
      wherein the at least two electrodes span all the lengths of the at least one reflector constructed on the waveguide;
      the proximate end of each of the at least two electrodes are located nearest the input of the optical waveguide;
      the distal end of each of at least two electrodes connected to the sampled voltage;
      wherein the sampled voltage propagates from the distal end to the proximate end of the at least two electrodes;
      wherein the at least two electrodes are arranged to impose an electric field on the electro-optically responsive material in response to the sampled voltage;
      wherein the at least one reflector reflects the laser light, or not, according to an encoding scheme implemented in the reflection spectrum of the reflector.

10. The quantizer of claim 9 wherein the at least one reflector comprises one or more of a grating, a distributed Bragg grating, a chirped grating, a phase shifted grating, an asymmetric grating, an altered index grating or a Fabry-Perot like structure.

11. The quantizer of claim 9 wherein the encoding scheme comprises one of a straight binary, Gray code, two's complement encoding, an encoding scheme with extra resolution when the analog input signal is around zero or an encoding scheme with extra sensitivity when the analog input signal is around zero.

12. The quantizer of claim 9 wherein the electro-optically responsive material comprises one of lithium niobate, lithium tantalite or lithium niobate doped with titanium.

13. A communication channel with an analog input signal and a digital output comprising:
- a transmitter with an input and an output;
- an optical link with an input and an output;
- and a receiver with an input and an output;
- the transmitter comprising:
- a sampler with an input and an output;
- wherein the analog signal input is connected to the sampler input and the output of the sampler is a sampled voltage;
- a laser light source with a plurality of laser light outputs each with a unique wavelength;
- an optical multiplexer with a plurality of inputs capable of receiving a plurality of wavelengths of laser light and outputting a single multi-wavelength laser light;
- at least one optical encoding channel;
- each at least one optical encoding channel comprising:
  - an optical element with an input, a direct output and a reflected output;
  - an optical waveguide with an input, constructed of an electro-optically responsive material;
  - one of the plurality of laser light outputs optically coupled to the input of the optical element;
  - the direct output of the optical element optically coupled to the input of the optical waveguide and the reflected output of the optical element optically coupled to one of the plurality of inputs of the optical multiplexer;
- each optical waveguide further comprising:
  - at least one reflector with a length and a reflection spectrum constructed on each waveguide;
  - at least two electrodes each with a distal end and a proximate end;
  - wherein the at least two electrodes span all the length of the at least one reflector;
  - the proximate end of each of the at least two electrodes located nearest the input of the optical waveguide;
  - the distal end of each of at least two electrodes connected to the sampled voltage wherein the sampled voltage propagates from the distal end to the proximate end of the at least two electrodes;
  - wherein the at least two electrodes are arranged to impose an electric field on the electro-optically responsive material in response to the sampled voltage;
  - wherein the reflection spectrum of the at least one reflector reflects the laser light, or not, according to an encoding scheme implemented in the reflection spectrum of the at least one reflector;
- the output of the optical multiplexer connected to the input of the optical link;
- the output of the optical link connected to the input of the receiver;
- the receiver comprising:
  - a demultiplexer with an input for multiwavelength laser light and a plurality of outputs, one for each wavelength of input laser light;
  - at least one detector with an input and an output wherein the detector input is connected to one of the plurality of outputs of the demultiplexer and the detector output is a bit of the digital output;
  - the receiver input connected to the input of the demultiplexer.

14. The communication channel of claim 13 wherein the at least one reflector comprises one or more of a grating, a distributed Bragg grating, a chirped grating, a phase shifted grating, an asymmetric grating, an altered index grating or a Fabry-Perot like structure.

15. The communication channel of claim 13 wherein the encoding scheme comprises one of a straight binary, Gray code, two's complement encoding, an encoding scheme with extra resolution when the analog input signal is around zero or an encoding scheme with extra sensitivity when the analog input signal is around zero.

16. The communication channel of claim 13 wherein the electro-optically responsive material comprises one of lithium niobate, lithium tantalite or lithium niobate doped with titanium.

17. A method of converting an analog input into a digital output comprising:
- optically coupling the output of a laser light source into at least one optical encoding channel;
- wherein the at least one optical encoding channel comprises one or more cascaded reflectors constructed on an optical waveguide responsive to an electric field, a laser light input, an analog signal input, and a bit of the digital output;
- wherein the analog input is coupled to the analog signal input of the optical encoding channel;
- encoding the analog input signal into a bit of the digital output of the optical encoding channel according to a shift in transmission spectrum of the cascaded reflectors caused by the electric field generated from the analog input signal.

18. A method of converting an analog signal into a digital output comprising:
- optically coupling the output of a laser light source into at least one optical encoding channel input
- wherein each at least one optical encoding channel comprises:
  - a waveguide constructed of electro-optically responsive material;
  - wherein the waveguide further comprises one or more reflectors;
  - at least two electrodes, a detector, and a bit of the digital output;
- stimulating the electrodes with the analog signal whereby an electric field is created in the electro-optically responsive waveguide;
- encoding the analog signal into the bit of the digital output of the optical encoding channel according to a shift in transmission spectrum of the optical reflectors caused by the electric field generated from the analog input signal; whereby the laser light of the laser light source is transmitted or not.

19. The method of claim 18 whereby the electric field is created from a sampled analog signal.

20. A method of converting an analog input into a digital output comprising:
- sampling the analog input;
- optically coupling the output of a laser light source into at least one optical encoding channel input;
- wherein each at least one optical encoding channel comprises:
  - an input, an output;
  - an optical element with a direct input, a direct output and an indirect output,
  - an optical waveguide with an input constructed of electro-optically responsive material,
  - a detector with an input and an output;
  - each optical waveguide further comprising:
    - at least one optical reflector with a length and a reflection spectrum constructed on the waveguide, at least a first electrode with distal end and proximate end and a second electrode with distal end and proximate end;

the first electrode and the second electrode spanning the length of all of the at least one reflector;

wherein the proximate ends of the first and second electrodes are located nearest the input of the optical waveguide, and said first and second electrodes distal ends connected to the sampled analog input;

wherein the optical encoding channel input is optically coupled to the optical element input, the optical element direct output is optically coupled to the waveguide, the optical element indirect output is optically coupled to the detector input, the detector output is connected to the output of the optical encoding channel, whereby the output of the optical encoding channel is a bit of the digital output;

encoding the analog signal into the bit of the digital output according to a shift in reflection spectrum of the optical reflectors caused by the electric field generated from the analog signal;

whereby the laser light of the laser light source is reflected or not, and collecting the output from each encoding channel into the digital output.

* * * * *